United States Patent
Yamaguchi et al.

(10) Patent No.: US 9,474,979 B2
(45) Date of Patent: Oct. 25, 2016

(54) GAME PROGRAM AND INFORMATION PROCESSING DEVICE

(71) Applicant: DeNA Co., Ltd., Tokyo (JP)

(72) Inventors: Kyohei Yamaguchi, Tokyo (JP); Tatsuya Koyama, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 0 days.

(21) Appl. No.: 14/531,126

(22) Filed: Nov. 3, 2014

(65) Prior Publication Data

US 2015/0151204 A1    Jun. 4, 2015

(30) Foreign Application Priority Data

Dec. 4, 2013 (JP) ................................. 2013-251198

(51) Int. Cl.
| | | |
|---|---|---|
| A63F 13/00 | (2014.01) | |
| A63F 13/825 | (2014.01) | |
| A63F 13/822 | (2014.01) | |
| A63F 13/833 | (2014.01) | |
| A63F 13/2145 | (2014.01) | |
| A63F 13/58 | (2014.01) | |
| A63F 13/60 | (2014.01) | |

(Continued)

(52) U.S. Cl.
CPC ......... *A63F 13/825* (2014.09); *A63F 13/2145* (2014.09); *A63F 13/426* (2014.09); *A63F 13/58* (2014.09); *A63F 13/60* (2014.09); *A63F 13/63* (2014.09); *A63F 13/69* (2014.09); *A63F 13/822* (2014.09); *A63F 13/833* (2014.09)

(58) Field of Classification Search
CPC .. A63F 13/822; A63F 13/825; A63F 13/833; A63F 13/58; A63F 13/60; A63F 13/63; A63F 13/69; A63F 13/2145

USPC .................................................. 463/9–12, 14
See application file for complete search history.

(56) References Cited

U.S. PATENT DOCUMENTS 6,171,189 B1 * 1/2001 Katano et al. .................. 463/43
7,025,675 B2 * 4/2006 Fogel et al. ...................... 463/9

(Continued)

FOREIGN PATENT DOCUMENTS

| JP | 2010-170290 A | 8/2010 |
|---|---|---|
| JP | 5204330 B | 2/2013 |
| JP | 5223031 B | 3/2013 |

OTHER PUBLICATIONS

Griffin, Todd, and Patrick Lowery. Posted by Rouse, Margaret. "macro" definition. Updated Sep. 2005. Whatis.com. <http://whatis.techtarget.com/definition/macro>.*

*Primary Examiner* — William H McCulloch, Jr.

(74) *Attorney, Agent, or Firm* — Procopio, Cory, Hargreaves & Savitch LLP

(57) ABSTRACT

The game program according to the present invention receives selection operation input from a player by allowing the player to select any character from among multiple characters. Then, it is determined whether the received selection operation input is one of a first selection operation input and a second selection operation input. If the first selection operation input is received, the character is configured as a source material character used to vary parameter values configured in the base character up to an upper limit, and, in addition, if the second selection operation input is received, then the character is configured as a source material character used to enable the parameter values configured in the base character to be increased beyond the upper limit.

7 Claims, 17 Drawing Sheets

(51) Int. Cl.
*A63F 13/63* (2014.01)
*A63F 13/69* (2014.01)
*A63F 13/426* (2014.01)

(56) References Cited

U.S. PATENT DOCUMENTS

| | | | | |
|---|---|---|---|---|
| 7,104,884 | B2* | 9/2006 | Yokoi | 463/7 |
| 7,179,171 | B2* | 2/2007 | Forlines et al. | 463/41 |
| 7,789,758 | B2* | 9/2010 | Wright | 463/42 |
| 8,540,570 | B2* | 9/2013 | Janis et al. | 463/31 |
| 9,314,700 | B2* | 4/2016 | Yamaguchi | A63F 13/63 |
| 2003/0236119 | A1* | 12/2003 | Forlines et al. | 463/41 |
| 2004/0053690 | A1* | 3/2004 | Fogel et al. | 463/31 |
| 2004/0204127 | A1* | 10/2004 | Forlines et al. | 455/566 |
| 2009/0305756 | A1* | 12/2009 | Blair | A63F 13/10 463/1 |
| 2012/0238362 | A1* | 9/2012 | Janis et al. | 463/31 |
| 2015/0011281 | A1* | 1/2015 | Kishimoto et al. | 463/11 |
| 2015/0031425 | A1* | 1/2015 | Higo | 463/9 |
| 2015/0065255 | A1* | 3/2015 | Otomo | 463/43 |
| 2015/0151204 | A1* | 6/2015 | Yamaguchi et al. | 463/9 |
| 2015/0174494 | A1* | 6/2015 | Yamaguchi | 463/43 |
| 2015/0182864 | A1* | 7/2015 | Wada et al. | 463/9 |
| 2015/0190715 | A1* | 7/2015 | Yamaguchi | 463/43 |

* cited by examiner

| Game ID | Game Title | Game Program | Game Data | |
|---|---|---|---|---|
| 0001 | ○○○○ | ○○○○.apk | ○○○○ | ... |
| . | . | . | . | |
| . | . | . | . | |
| . | . | . | . | |

FIG. 3

| Character ID | Character Name | Character Image | Rarity | Initial Attack Power | Initial Defense Power | Initial Physical Strength | Initial Upper Attack Power Limit | Initial Upper Defense Power Limit | Initial Upper Physical Strength Limit |
|---|---|---|---|---|---|---|---|---|---|
| 0001 | Character A |  | Common | 15 | 8 | 10 | 100 | 100 | 100 |
| 0002 | Character B |  | Uncommon | 30 | 20 | 15 | 300 | 300 | 300 |
| 0003 | Character C |  | Rare | 45 | 30 | 25 | 600 | 600 | 600 |
| 0004 | Character D |  | Super-rare | 60 | 55 | 60 | 1000 | 1000 | 1000 |
| . . . | . . . | . . . | . . . | . . . | . . . | . . . | . . . | . . . | . . . |

| Player ID | Player Name | Game ID | Game Data | |
|---|---|---|---|---|
| 0001 | OOOO | 0001 | OOOO | ... |
| | | 0005 | OOOO | |
| | | . . . | OOOO | |
| . . . | . . . | . . . | . . . | |

| Proprietary Character Information | | | | | | |
|---|---|---|---|---|---|---|
| Character ID | Attack Power | Defense Power | Physical Strength | Upper Attack Power Limit | Upper Defense Power Limit | Upper Physical Strength Limit |
| 0011 | 15 | 10 | 200 | 200 | 200 | 200 |
| 0211 | 20 | 23 | 150 | 150 | 150 | 150 |
| 0133 | 70 | 45 | 100 | 100 | 200 | 100 |
| 0201 | 22 | 40 | 600 | 500 | 600 | 700 |
| 0072 | 60 | 50 | 250 | 200 | 200 | 300 |
| 0094 | 300 | 200 | 450 | 600 | 600 | 600 |
| . | . | . | . | . | . | . |
| . | . | . | . | . | . | . |
| . | . | . | . | . | . | . |

FIG. 7

| Fusion Information | |
|---|---|
| Base Character | Source Material Character |
| 0001 | 0001 |
| | 0010 |
| | 0020 |
| ⋮ | ⋮ |

FIG. 8

GAME PROGRAM AND INFORMATION PROCESSING DEVICE

The present application claims the benefit of foreign priority under 35 USC 119 based on Japanese Patent Application No. 2013-251198, filed Dec. 4, 2013, the contents of which is incorporated herein by reference in its entirety.

TECHNICAL FIELD

The present invention relates to a game program and an information processing device.

BACKGROUND ART

Game programs are known (for example, see Patent Document 1), in which selection operation input is received from a player and a sub-character selected by the player is fused with a main character, thereby increasing the parameter values of the main character (enhancement fusion) or enabling the parameter values of the main character to be increased beyond an upper limit (evolutionary fusion).

PRIOR ART DOCUMENTS

Patent Documents

[Patent Document 1]
  Japanese Patent Publication No. 5204330

SUMMARY OF THE INVENTION

Problems to be Solved by the Invention

In such game programs, the player had to be enabled to perform selection operations used either for selecting characters used in character fusion or for selecting the method of their fusion (for selecting enhancement fusion or evolutionary fusion). The present invention has been devised with these circumstances in mind and it is an object of the invention to improve the operational functionality of selection operations performed by the player.

Means for Solving the Problems

The main inventive idea of the present invention, which intends to resolve the above-mentioned problems, is a game program (e.g., computer readable medium containing instructions) that directs a computer to carry out: screen generation processing to generate a game screen including a character placement area, in which multiple characters that a player may select are placed; receive processing to receive a selection operation input from the player by allowing the player to select any character among the multiple characters when the character placement area is displayed on the game screen; determination processing to determine whether the received selection operation input is one of a first selection operation input and a second selection operation input; and selected character configuration processing during which, if it is determined that a first selection operation input has been received, the character selected by the player is configured as a selectable object and, at the same time, the character used as a selectable object is configured as a source material character used to vary parameter values configured in a base character up to an upper limit, and, in addition, if it is determined that a second selection operation input has been received, the character selected by the player is configured as a selectable object and, at the same time, the character used as a selectable object is configured as a source material character used to enable parameter values configured in the base character to be increased beyond the upper limit.

Other features of the present invention will become apparent from this description and the accompanying drawings.

BRIEF DESCRIPTION OF THE DRAWINGS

FIG. 3 A diagram showing an example data structure of game information.
FIG. 7 A diagram showing an example data structure of proprietary character information.
FIG. 8 A diagram showing an example data structure of fusion information.

MODE FOR CARRYING OUT THE INVENTION

Figure 1:
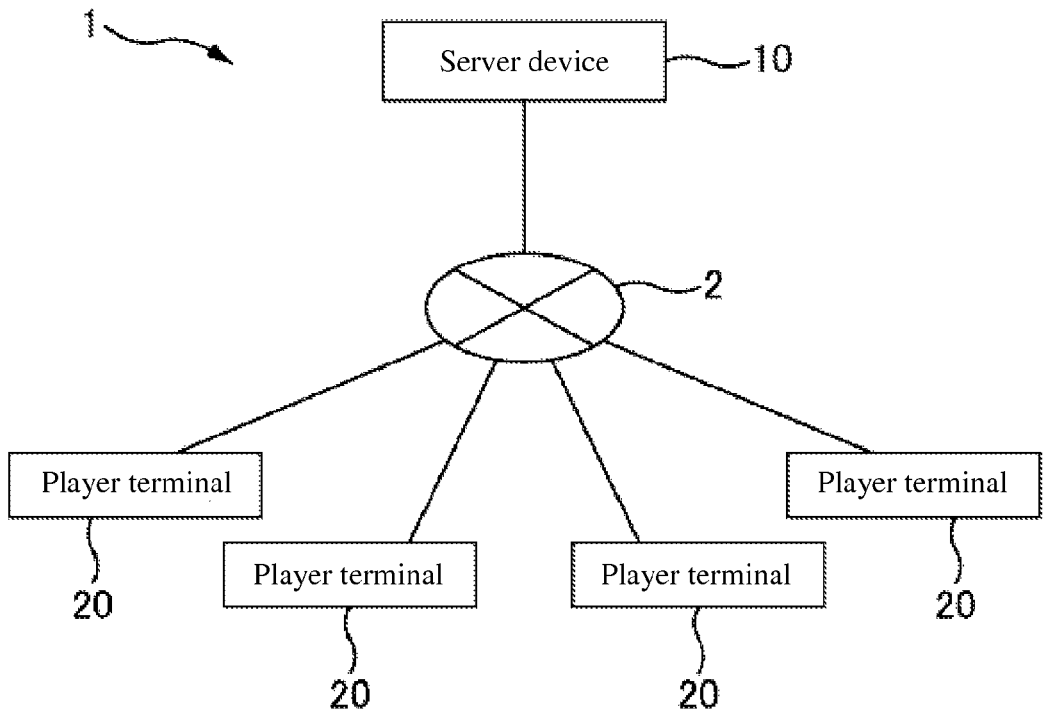
FIG. 1 A diagram showing an example configuration of the entire game system 1.

At least the following will become apparent from this description and the accompanying drawings.

Namely, a game program (e.g., computer readable medium containing instructions) that directs a computer to carry out: screen generation processing to generate a game screen including a character placement area, in which multiple characters that a player may select are placed; receive processing to receive a selection operation input from the player by allowing the player to select any character among the multiple characters when the character placement area is displayed on the game screen; determination processing to determine whether the received selection operation input is one of a first selection operation input and a second selection operation input; and selected character configuration processing during which, if it is determined that a first selection operation input has been received, the character selected by the player is configured as a selectable object and, at the same time, the character used as a selectable object is configured as a source material character used to vary parameter values configured in a base character up to an upper limit, and, in addition, if it is determined that a second selection operation input has been received, the character selected by the player is configured as a selectable object and, at the same time, the character used as a selectable object is configured as a source material character used to enable parameter values configured in the base character to be increased beyond the upper limit.

Since such a game program allows the player to carry out the selection of the character used in character fusion and the selection of the method of its fusion in a single operation, it becomes possible to improve the operational functionality of the selection operations performed by the player.

In addition, a game program (e.g., computer readable medium containing instructions) that directs a computer to carry out: screen generation processing to generate a game screen including a character placement area, in which multiple characters that a player may select are placed; receive processing to receive a selection operation input from the player by allowing the player to select any character among the multiple characters when the character placement area is displayed on the game screen; determination processing to determine whether the received selection operation input is one of a first selection operation input and a second selection operation input; and selected character configuration processing during which, if it is determined that a first selection operation input has been received, the character selected by the player is configured as a selectable object and, at the same time, the character used as a selectable object is configured as a source material character used to vary parameter values configured in a base character up to an upper limit, and, in addition, if it is determined that a second selection operation input has been received, the character selected by the player is configured as a selectable object and, at the same time, the character used as a selectable object is configured as a source material character used to change the base character to a character of a different type.

Since such a game program allows the player to carry out the selection of the character used in character fusion and the selection of the method of its fusion in a single operation, it becomes possible to improve the operational functionality of the selection operations performed by the player.

Further, in such a game program (e.g., computer readable medium containing instructions), the screen generation processing may be adapted to generate a game screen including a game field area, where the characters configured as selectable objects based on the first selection operation input by the player can be placed until a maximum number is reached, and the selected character configuration processing may be adapted such that, along with confirming the characters configured as selectable objects as soon as the number of the characters placed in the game field area reaches the maximum number, each character is confirmed as a source material character used to vary parameter values configured in the base character up to an upper limit.

In such a game program, since the selection of character fusion itself is confirmed simultaneously with confirming the selection of a character if the number of characters defined as selectable objects reaches a maximum number, there is no need for the player to perform a separate operation for confirming such a selection setting and it becomes possible to further improve the operational functionality.

In addition, in such a game program, the selected character configuration processing may be adapted such that, as soon as the second selection operation input is received from the player, the character configured as a selectable object is confirmed and, at the same time, the character used as a selectable object is confirmed as a source material character used to change the base character to a character of a different type or as a source material character used to enable parameter values configured in the base character to be increased beyond an upper limit.

In such a game program, since the selection of action to be applied to a character is confirmed simultaneously with confirming the selection of this character if the second selection operation input is received from the player, there is no need for the player to perform a separate operation for confirming such a selection setting and it becomes possible to further improve the operational functionality.

In addition, in such a game program (e.g., computer readable medium containing instructions), the screen generation processing may be adapted to generate a game screen including the character placement area, a first source material character placement area, in which source material characters configured based on the player's first selection operation input are placed, and a second source material character placement area, in which source material characters configured based on the player's second selection operation input are placed, such that if a first selection operation input among a first selection operation input and a second selection operation input is received when the game screen is displayed, the character selected by the player in the character placement area is placed as a source material character in the first source material character placement area, and if a second selection operation input among a first selection operation input and a second selection operation input is received when the game screen is displayed, the character selected by the player in the character placement area is placed as a source material character in the second source material character placement area.

In such a game program, since the player can perform the first selection operation input and second selection operation input simultaneously on a single game screen, it becomes possible to improve the operational functionality of the selection operations performed by the player.

Furthermore, this is an information processing device provided with: a screen generation processing unit which generates a game screen including a character placement area, in which multiple characters that a player may select are placed; a receive processing unit which receives a selection operation input from the player by allowing the player to select any character among the multiple characters when the character placement area is displayed on the game screen; a determination processing unit which determines whether the received selection operation input is one of a first selection operation input and a second selection operation input; and a selected character configuration processing unit which, if it is determined that a first selection operation input has been received, configures the character selected by the player as a selectable object and, at the same time, configures the character used as a selectable object as a source material character used to vary parameter values configured in a base character up to an upper limit, and, in addition, if it is determined that a second selection operation input has been received, configures the character selected by the player as a selectable object and, at the same time, configures the character used as a selectable object as a source material character used to enable parameter values configured in the base character to be increased beyond the upper limit.

In such an information processing device, it becomes possible to improve the operational functionality of the selection operations performed by the player.

Further, this is an information processing device provided with: a screen generation processing unit which generates a game screen including a character placement area, in which multiple characters that a player may select are placed; a receive processing unit which receives a selection operation input from the player by allowing the player to select any character among the multiple characters when the character placement area is displayed on the game screen; a determination processing unit which determines whether the received selection operation input is one of a first selection operation input and a second selection operation input; and a selected character configuration processing unit which, if it is determined that a first selection operation input has been received, configures the character selected by the player as a selectable object and, at the same time, configures the character used as a selectable object as a source material character used to vary parameter values configured in a base character up to an upper limit, and, in addition, if it is determined that a second selection operation input has been received, configures the character selected by the player as a selectable object and, at the same time, configures the character used as a selectable object as a source material character used to change the base character to a character of a different type.

In such an information processing device, it becomes possible to improve the operational functionality of the selection operations performed by the player.

Embodiment 1

A game system 1 according to a first embodiment of the present invention will be discussed below.

<<Configuration of Game System 1>>

FIG. 1 is a diagram showing an example configuration of the entire game system 1 according to the present embodiment. The game system 1 provides various game-related services to the player over a network 2 (for example, the Internet) and includes a server device 10 and multiple player terminals 20.

<<Configuration of Server Device 10>>

Figure 2:
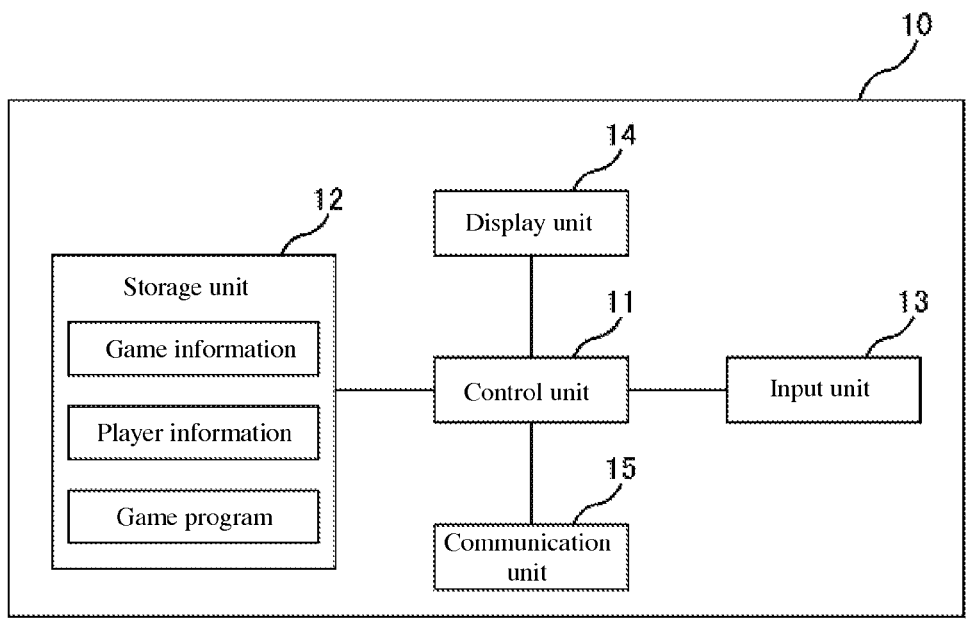
FIG. 2 A block diagram showing the functional configuration of the server device 10.

FIG. 2 is a block diagram showing the functional configuration of the server device 10 according to the present embodiment. When the server device 10, which is an information processing device (e.g., a workstation, a personal computer, etc.) used by a system administrator, or the like, to operate and manage gaming services, receives various types of commands (requests) from the player terminals 20, it can distribute (respond with) game programs operational on the player terminals 20 and web pages (game screens, etc.) created in a markup language (HTML, etc.) adapted to the specifications of the player terminals 20. This server device 10 has a control unit 11, a storage unit 12, an input unit 13, a display unit 14, and a communication unit 15.

The control unit 11, along with transferring data between the components, exercises overall control over the server device 10, and is implemented using a CPU (Central Processing Unit) that runs a predetermined program stored in memory.

The storage unit 12 has a ROM (Read Only Memory), which is a read-only storage area where operating system software is stored, and a RAM (Random Access Memory), which is a rewritable storage area used as a work area for arithmetic processing by the control unit 11, and is implemented as a non-volatile storage device, such as a flash memory, a hard disk, and the like. The storage unit 12 of the present embodiment stores at least game information, i.e. information related to a game program (game application) that can be supplied to the player, player information, i.e. player-related information, and a game program (game application).

FIG. 3 is a diagram showing an example data structure of the game information stored in the storage unit 12 of the server device 10. This game information has Game ID, Game Name, Game Program, Game Data and other elements. Game ID represents identification information identifying a game program (game application). Game Name represents information indicating the display name of the game application supplied to the player. Game Program represents information indicating a program file. Game Data represents information indicating data relevant to the game program. Since game applications of multiple types are thus configured in the game information, players can download their favorite game applications by accessing the server device 10 by operating the player terminals 20.

Figure 4:
FIG. 4 A diagram showing an example data structure of character information.
Figure 4:
Figure 4:
Figure 4:

FIG. 4 is a diagram showing an example data structure of character information, as an example of game data. Character information represents information related to the characters used in the game. This character information has elements (fields) such as Character ID, Character Name, Character Image, Rarity, Initial Attack Power, Initial Defense Power, Initial Physical Strength, Initial Upper Attack Power Limit, Initial Upper Defense Power Limit, and Initial Upper Physical Strength Limit. Character ID represents identification information identifying a character. Character Name represents information indicating the display name of the character. Character Image represents image data for the character. Rarity is a parameter indicating the degree of scarcity of the character. In the present embodiment, 4-tier rarity ("Common">"Uncommon">"Rare">"Super-rare") is configured in the character. Initial Attack Power, Initial Defense Power, and Initial Physical Strength of the character are parameters indicating capability values initially configured in the character. Initial Upper Attack Power Limit, Initial Upper Defense Power Limit, and Initial Upper Physical Strength Limit of the character are upper limit values (maximum values) initially configured for each parameter.

Figures 5, 6:
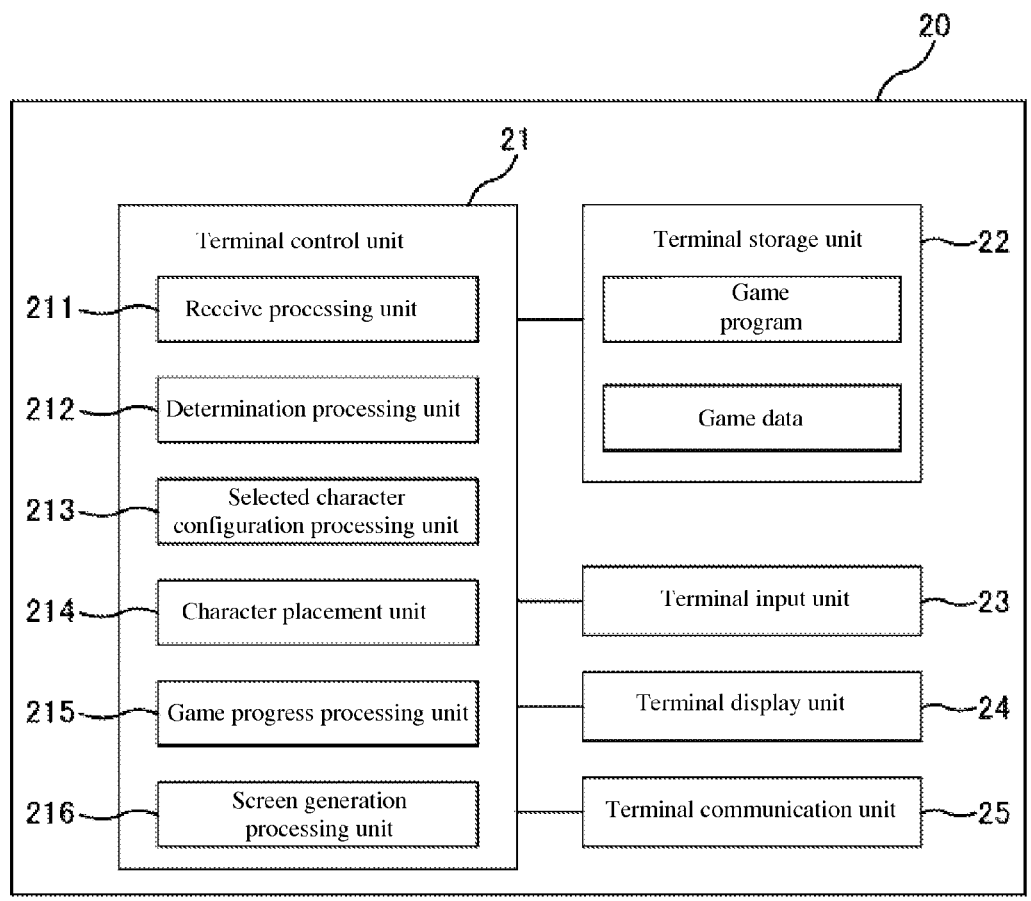
FIG. 5 A diagram showing an example data structure of player information.
FIG. 6 A block diagram showing the functional configuration of the player terminal 20.

FIG. 5 is a diagram showing an example data structure of the player information stored in the storage unit 12 of the server device 10. This player information has elements such as Player ID, Player Name, Game ID, and Game Data. Player ID represents identification information identifying a player. Player Name represents information indicating the display name of the player. Game ID represents identification information identifying the game application (downloaded game application) the player owns. Game Data is information indicating data used by the player in connection with the game application the player owns (data related to levels and various other parameters, and to the characters and items the player owns).

The input unit 13, which is used by a system administrator, or the like, to enter various types of data (e.g., game information, etc.), is implemented, for example, as a keyboard, a mouse, and the like.

The display unit 14, which is used to display an operation screen for use by a system administrator in response to a command from the control unit 11, is implemented, for example, as a liquid crystal display (LCD: Liquid Crystal Display) or the like.

The communication unit 15, which is used for communication with the player terminals 20, has receiver functionality for receiving various types of data and signals transmitted from the player terminals 20 and transmitter functionality for transmitting various types of data and signals to the player terminals 20 in response to commands from the control unit 11.

<<Configuration of Player Terminal 20>>

FIG. 6 is a block diagram showing the functional configuration of a player terminal 20. The player terminal 20 of the present embodiment, which is an information processing device that players use during game play (e.g., a mobile phone terminal, a smart phone, a tablet type terminal, etc.), can transmit delivery requests regarding various types of game-related information (game programs, game data, etc.) to the server device 10. This player terminal 20 has a terminal control unit 21, a terminal storage unit 22, a terminal input unit 23, a terminal display unit 24, and a terminal communication unit 25.

The terminal control unit 21, along with transferring data between the components, exercises overall control over the player terminal 20 and is implemented using a CPU (Central Processing Unit) that runs a predetermined program stored in memory. The terminal control unit 21 of the present embodiment has a receive processing unit 211, a determination processing unit 212, a selected character configuration processing unit 213, a character placement unit 214, a game progress processing unit 215, and a screen generation processing unit 216.

The receive processing unit 211 possesses functionality to carry out processing for receiving operating commands based on various operations performed by the player. The receive processing unit 211 in the present embodiment can receive selections related to characters used in character fusion and selections related to the methods of their fusion using a single selection operation input.

The determination processing unit 212 possesses functionality to carry out various types of determination processing. For example, the determination unit 212 of the present embodiment determines whether a selection operation input received by the receive processing unit 211 is a first selection operation input or a second selection operation input.

The selected character configuration processing unit 213 possesses functionality to carry out processing for performing various types of configuration related to characters. For example, upon receipt of a single selection operation input by the receive processing unit 211, the selected character configuration processing unit 213 of the present embodiment, along with configuring the character selected by the player as a selectable object, configures the character used as a selectable object as a source material character used for enhancement fusion or evolutionary fusion.

The character placement unit 214 possesses functionality to carry out processing for placing multiple characters in the game field area, character placement area, etc. The character placement unit 214 of the present embodiment places the character candidates eligible for selection in the character placement area and places characters selected by the player from among the characters placed in the character placement area in the game field area.

The game progress processing unit 215 possesses functionality to carry out processing for directing the game to proceed in accordance with the game program. The game progress processing unit 215 of the present embodiment, for example, possesses functionality to carry out fusion processing for fusing source material characters selected by the player with a base character.

The screen generation processing unit 216 possesses functionality to carry out processing for generating screen data used to display a game screen on a terminal display unit 24. The screen generation processing unit 216 of the present embodiment generates screen data used to display a game screen including a game field area, a character placement area, various characters, and the like on the terminal display unit 24.

The terminal storage unit 22, which is connected to the terminal control unit 21 across a bus, carries out processing for looking up, reading out, and re-writing stored data in response to commands from the terminal control unit 21. This terminal storage unit 22 is implemented, for example, as a flash memory, a hard disk, or the like. The terminal storage unit 22 of the present embodiment stores at least all, or a portion of, game programs downloaded from the server device 10 and game data downloaded from the server device 10.

FIG. 7 is a diagram showing an example data structure of proprietary character information, as an example of game data. The proprietary character information represents information indicating characters owned by the player. This proprietary character information has elements such as Character ID, character's Attack Power, Defense Power, Physical Strength, Upper Attack Power Limit, Upper Defense Power Limit, and Upper Physical Strength Limit. Character ID represents identification information identifying characters owned by the player. The Attack Power, Defense Power, and Physical Strength of the character represent information indicating the current values of these parameters configured in the characters owned by the player. The Upper Attack Power Limit, Upper Defense Power Limit, and Upper Physical Strength Limit of the character represent information indicating the current upper limit values of these parameters configured in the characters owned by the player. These various parameters are updated as the game progresses.

FIG. 8 is a diagram showing an example data structure of fusion information, as an example of game data. The fusion information is information that defines the conditions of character evolution. Source material characters that can be used for the evolutionary fusion of each base character are configured in this fusion information in connection with each base character. At least a character having the same Character ID as the base character (a character that is the same as the base character) is configured in the fusion information of the present embodiment as a source material character that can be used for evolutionary fusion.

<<Game Overview>>

An overview of the game provided by the game system 1 of the present embodiment is provided below. In this game system 1, the player terminal 20 makes it possible for the player to play a game by installing a game program downloaded from the server device 10 and then running this game program.

Below, explanations are given with reference to a case in which the player terminals 20 run a lottery game-related game program and the terminal input unit 23 of the player terminals 20 is a touch panel. It should be noted that the present invention is also applicable to game devices, or the like, having a controller.

<Lottery Game>

In the game program according to the present embodiment, the player can play a lottery game called "Gacha game" (registered trademark). In the lottery game, a character selected from among multiple characters that constitute a deck is provided to the player. The player can own multiple characters by playing the lottery game. In addition, the player can perform character fusion using the characters in his or her possession.

<Character Fusion>

In the game program according to the present embodiment, the player can perform character fusion by combining two characters selected from among the multiple characters in the player's possession. Character fusion in the present embodiment is carried out using two fusion methods, i.e. enhancement fusion and evolutionary fusion.

(Enhancement Fusion)

In the present embodiment, enhancement fusion is performed by combining at least one source material character with a base character. Such enhancement fusion increases the current values of parameters configured in the base character prior to fusion up to an upper limit value and the parameters obtained after the increase are reconfigured in the base character generated after fusion. If the enhancement fusion is performed in this manner, then the player cannot own both the base character and the source material character and can only own the base character generated after enhancement fusion.

(Evolutionary Fusion)

In addition, in the present embodiment, evolutionary fusion is performed by combining a base character with a source material character that can be used for evolutionary fusion. Such evolutionary fusion increases the upper limit values of the parameters configured in the base character prior to fusion and the parameter values are reconfigured in the base character generated after fusion such that they can be increased beyond the upper limits. If the evolutionary fusion is performed in this manner, then the player cannot own both the base character and the source material character and can only own the base character generated after evolutionary fusion.

<Character Selection Operation>

During such character fusion in the present embodiment, the player selects characters used for character fusion by operating a touch panel. Specifically, when the game field area, in which the base character is placed, and the character placement area, in which multiple character candidates eligible for selection are placed, are displayed on the game screen, the player operates the touch panel and moves any one of the characters located in the character placement area to the game field area, thereby selecting a source material character for fusion with the base character.

When the player performs an operation to select a source material character during character fusion in the present embodiment, the player can selectively perform either a first selection operation, which is used to perform enhancement fusion, or a second selection operation, which is used to perform evolutionary fusion.

When the player performs the first selection operation by operating the touch panel, the character selected by the player is configured as a selectable object and, at the same time, this character used as a selectable object is configured as a source material character for enhancement fusion. On the other hand, when the player performs the second selection operation by operating the touch panel, the character selected by the player is configured as a selectable object and, at the same time, this character used as a selectable object is configured as a source material character for evolutionary fusion.

In the present embodiment, when the player operates the touch panel by tapping on a character located in the character placement area (by momentarily bringing a finger in contact with the screen), it is determined that the player has performed a first selection operation. In addition, when the player operates the touch panel by flicking on a character located in the character placement area (by bringing a finger in contact with the screen and sliding it), it is determined that the player has performed a second selection operation.

In this manner, it becomes possible for the player to simultaneously select the source material character and the method of fusion by performing a single selection operation. In addition, even if the player selects the same character, the different selection operations make it possible to differentiate between the methods of the fusion performed using the character. Thus, since there is no need to spend additional time to separately select the source material character and the method of fusion that uses the source material character, the operational functionality of the selection operations performed by the player can be improved.

<Screen Transitions Related to Selection Operations>

Figure 9:
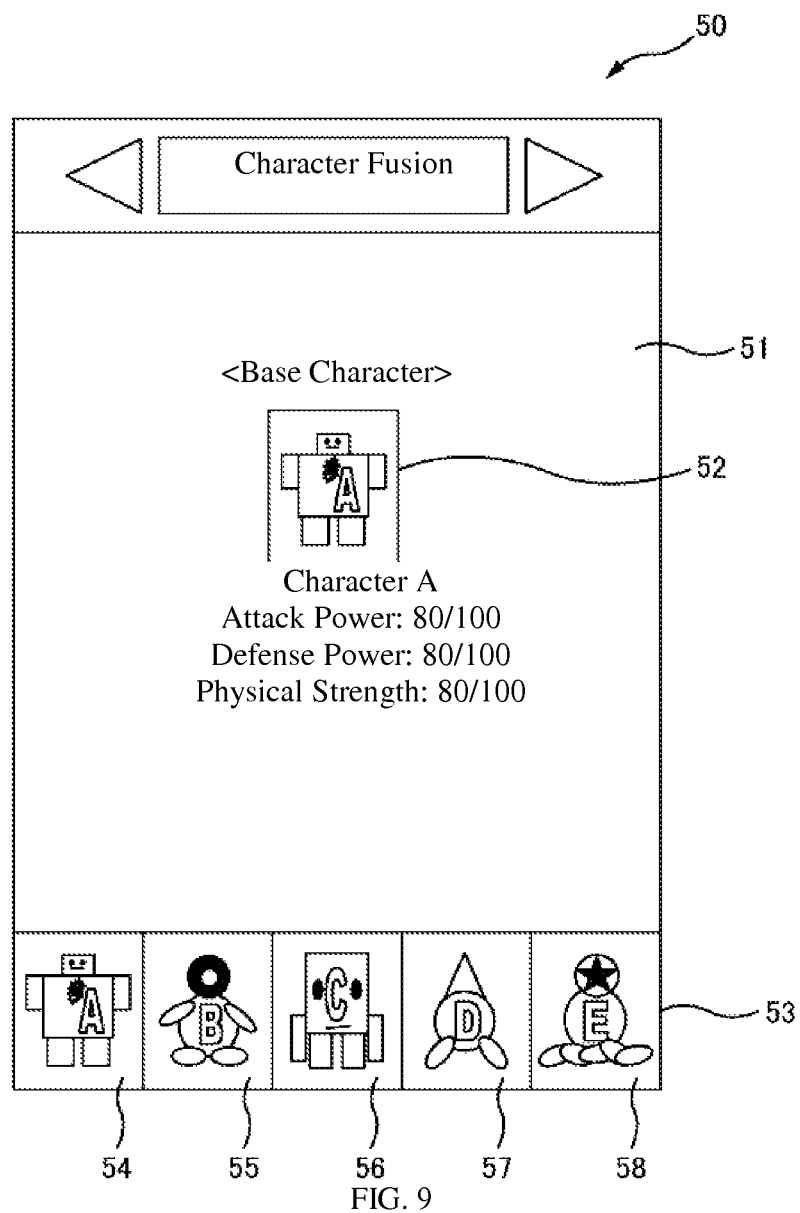
FIG. 9 A diagram showing an example of the game screen 50 displayed before character fusion.

FIG. 9 is a diagram showing an example of the game screen 50 displayed before character fusion. A game field area 51, a base character 52, and a character placement area 53 are displayed on the game screen 50. Along with displaying the base character 52 subject to evolutionary fusion and enhancement fusion, the game field area 51 displays character information in connection with this base character 52. Here, "Character A" is configured as the base character 52 and Attack Power, Defense Power, and Physical Strength are displayed as the capability parameters of this "Character A". For each parameter, the displayed upper limit value is "100" points and the current value is "80" points. Five characters, 54-58, which are candidates eligible for selection, are displayed in the character placement area 53. The characters 54-58 are characters chosen from among the characters the player owns.

In the present embodiment, the player can select characters to be fused with the base character from among the five characters 54-58 located in the character placement area 53 by operating the touch panel.

Figure 10:
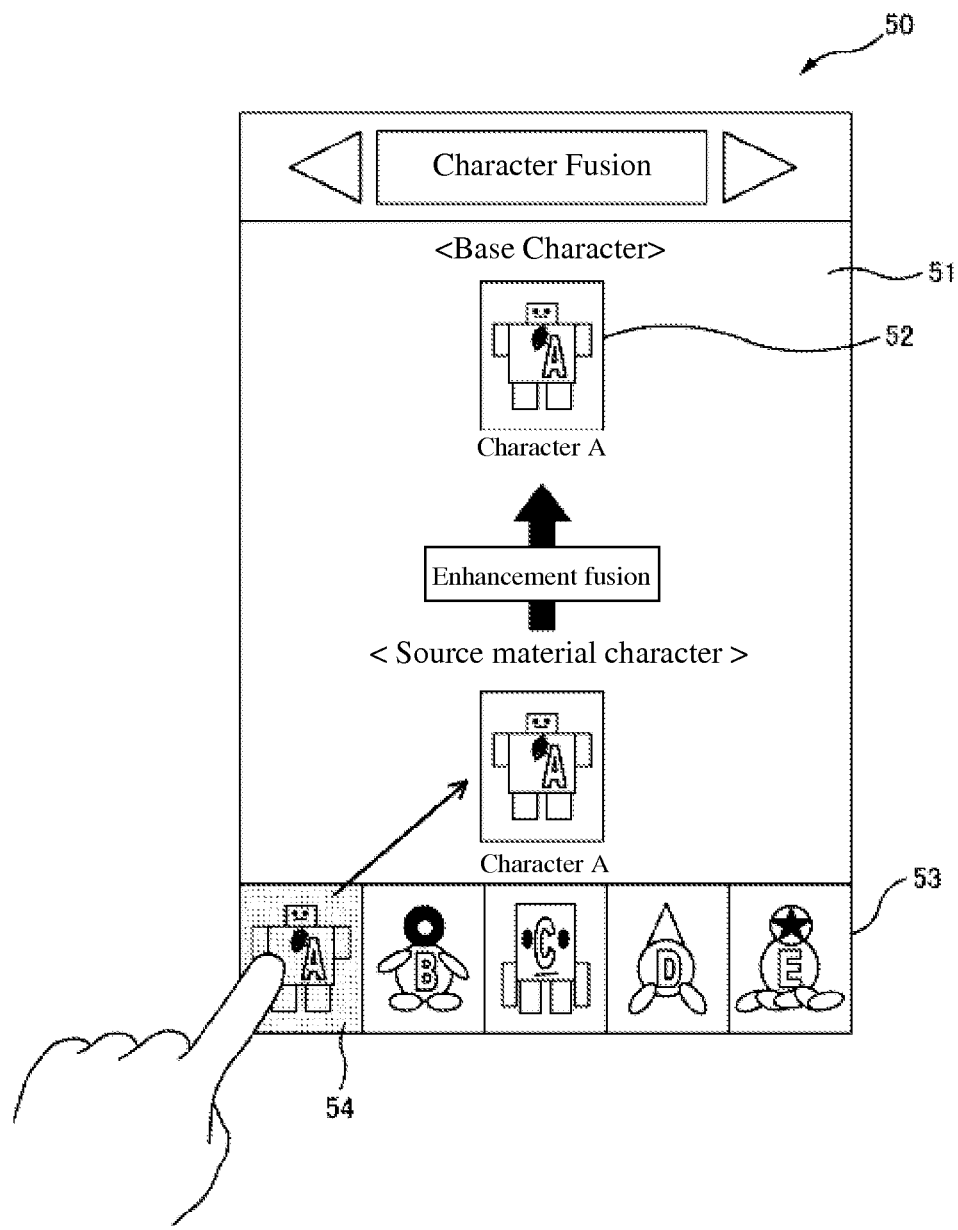
FIG. 10 A diagram used to illustrate an example of the first selection operation.

FIG. 10 is a diagram used to illustrate an example of the first selection operation. Here, explanations are given with reference to a case in which character 54 is selected as a source material character used for enhancement fusion. Since in the present embodiment this character 54 is the same "Character A" as the base character 52, it is configured as a character that can be used both for evolutionary fusion and for enhancement fusion.

Here, if the player performs the first selection operation when the game screen 50 is displayed, the character 54 is configured as a selectable object and, at the same time, this character 54 is configured as a source material character used for enhancement fusion. The first selection operation is performed by tapping on the character 54 displayed on the game screen 50. When the player lifts his or her finger off the game screen 50, the character 54 is moved from the character placement area 53 to the game field area 51. In the character placement area 53, the location of the selected character 54 is indicated in gray. Then, when character 54 is placed in the game field area 51, the selection of the source material character is confirmed and enhancement fusion with the base character 52 is automatically initiated.

Figure 11:
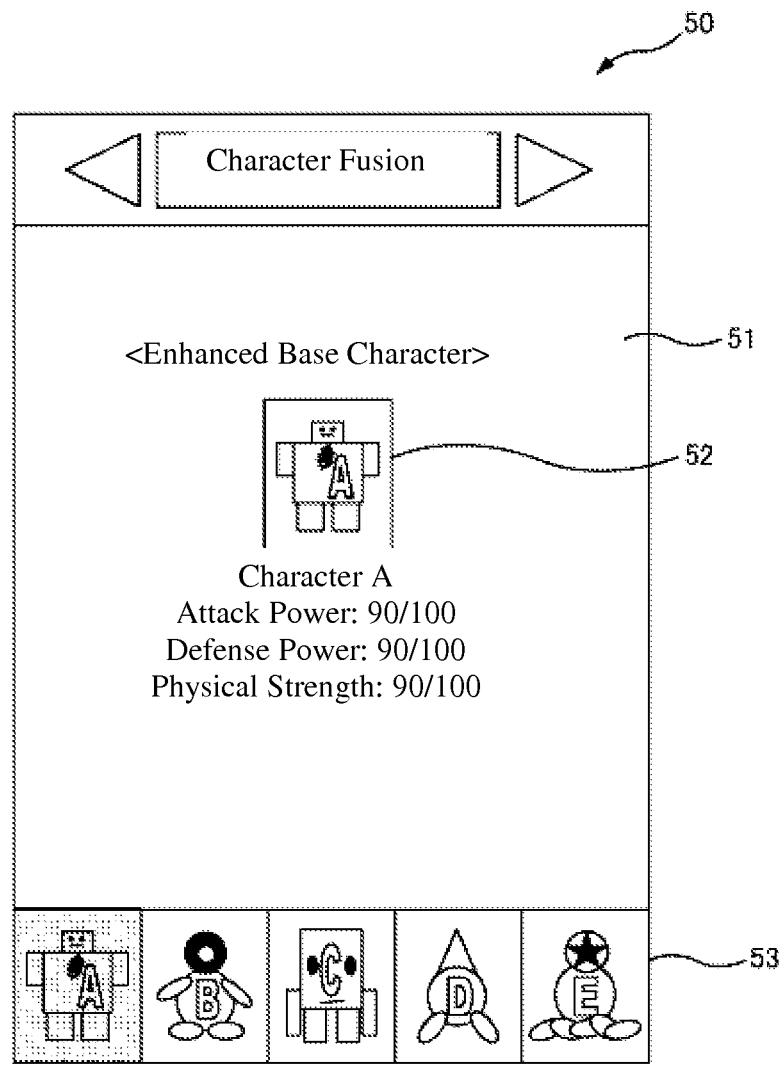
FIG. 11 A diagram showing an example of the game screen 50 displayed after enhancement fusion.

FIG. 11 is a diagram showing an example of the game screen displayed after enhancement fusion. Along with displaying "Character A", that is, the base character 52 generated after enhancement fusion, the game field area 51 displays character information in connection with the base character 52. Here, Attack Power, Defense Power, and Physical Strength are displayed as the capability parameters of "Character A". For each parameter, the displayed upper limit value is "100" points and the current value is "90" points. Namely, it is shown that, as a result of the enhancement fusion, the current values of the capability parameters configured in the base character 52 have increased towards the upper limit values.

Figure 12:
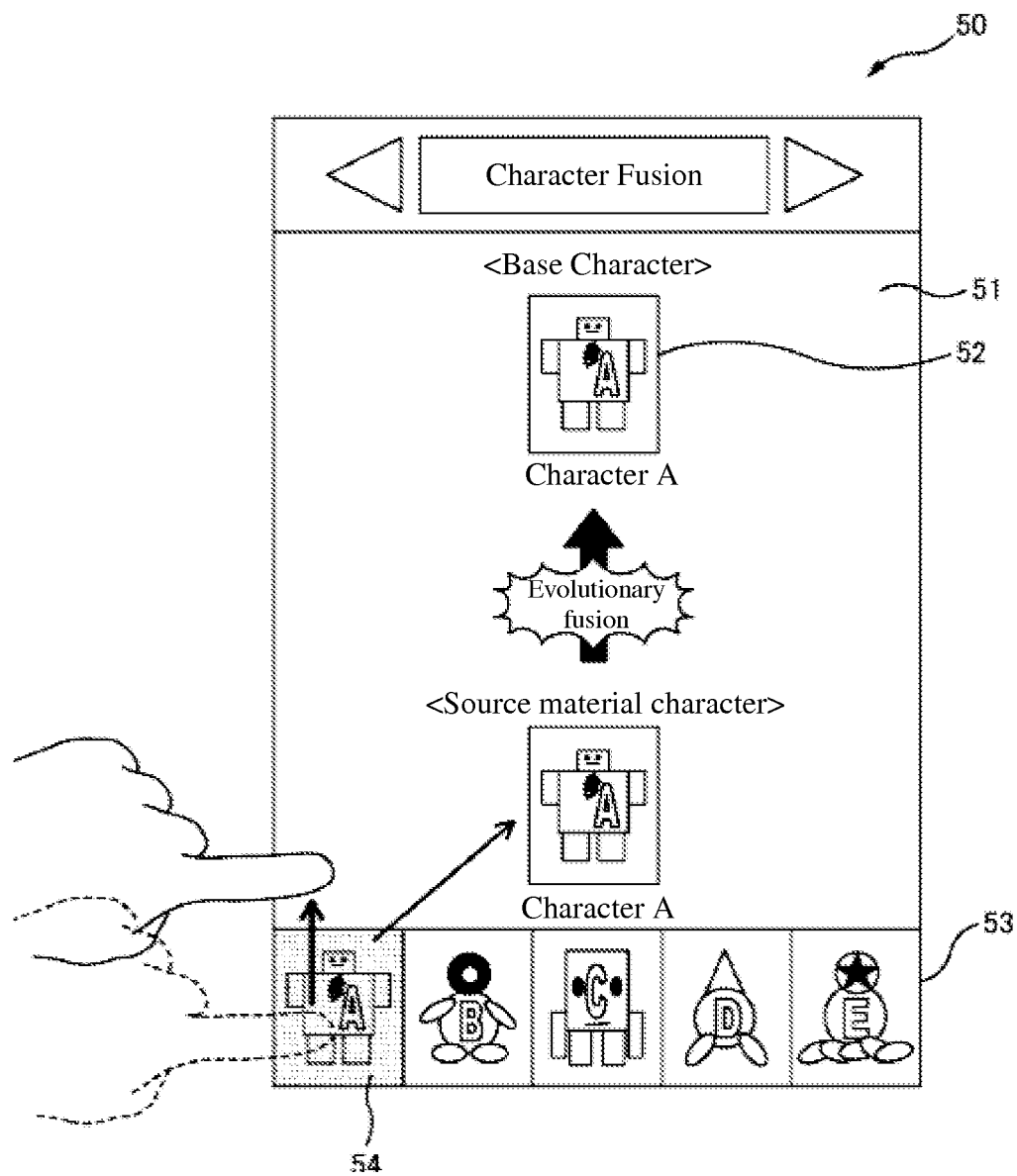
FIG. 12 A diagram used to illustrate an example of the second selection operation.

FIG. 12 is a diagram used to illustrate an example of the second selection operation. Here, explanations are given with reference to a case in which the character 54 is selected as a source material character used for evolutionary fusion. Since in the present embodiment this character 54 is the same "Character A" as the base character 52, it is configured as a character that can be used both for evolutionary fusion and enhancement fusion.

Here, if the player performs the second selection operation when the game screen 50 is displayed, the character 54 is configured as a selectable object and, at the same time, this character 54 is configured as a source material character used for evolutionary fusion. The second selection operation is performed by touching and sliding the character 54 displayed on the game screen 50. When the player lifts his or her finger used to slide the character off the game screen 50, the character 54 is moved from the character placement area 53 to the game field area 51. In the character placement area 53, the location of the selected character 54 is indicated in gray. Then, when character 54 is placed in the game field area 51, the selection of the source material character is confirmed and evolutionary fusion with the base character 52 is automatically initiated.

Figure 13:
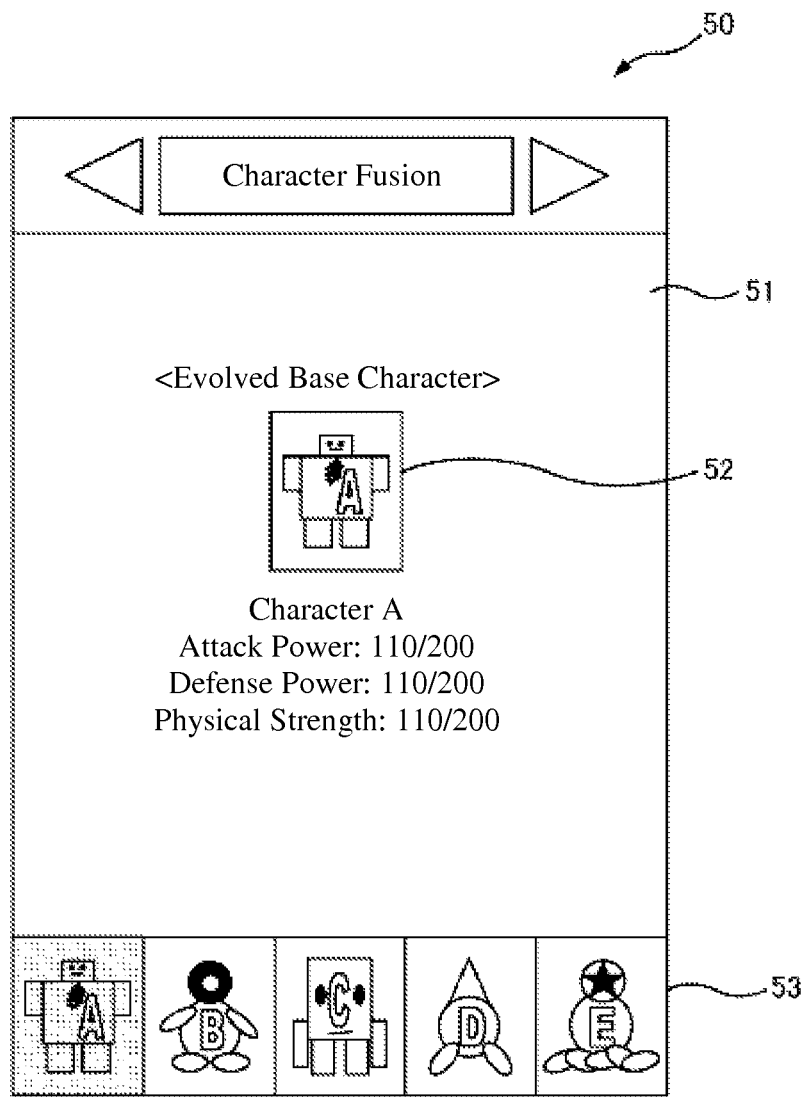
FIG. 13 A diagram showing an example of the game screen 50 displayed after evolutionary fusion.

FIG. 13 is a diagram showing an example of the game screen displayed after evolutionary fusion. Along with displaying "Character A", that is, the base character 52 generated after evolutionary fusion, the game field area 51 displays character information in connection with the base character 52. Here, Attack Power, Defense Power, and Physical Strength are displayed as the capability parameters of "Character A". For each parameter, the displayed upper limit value has increased to "200" points and the current value has increased to "110" points. Namely, it is shown that not only the current values but also the upper limit values of the capability parameters configured in the base character 52 have increased as a result of the evolutionary fusion.

Thus, since in the present embodiment the selection of both the source material character and the method of its fusion is confirmed and character fusion with the base character 52 is automatically initiated simultaneously with performing a selection operation on the character 54, there is no need to spend time on performing operations to initiate fusion (e.g., no need to spend time on pressing a "Start Fusion" button, no need to spend time on making a selection between enhancement fusion and evolutionary fusion), and this improves the operational functionality.

<<Operation of Player Terminal 20>>

Figure 14:
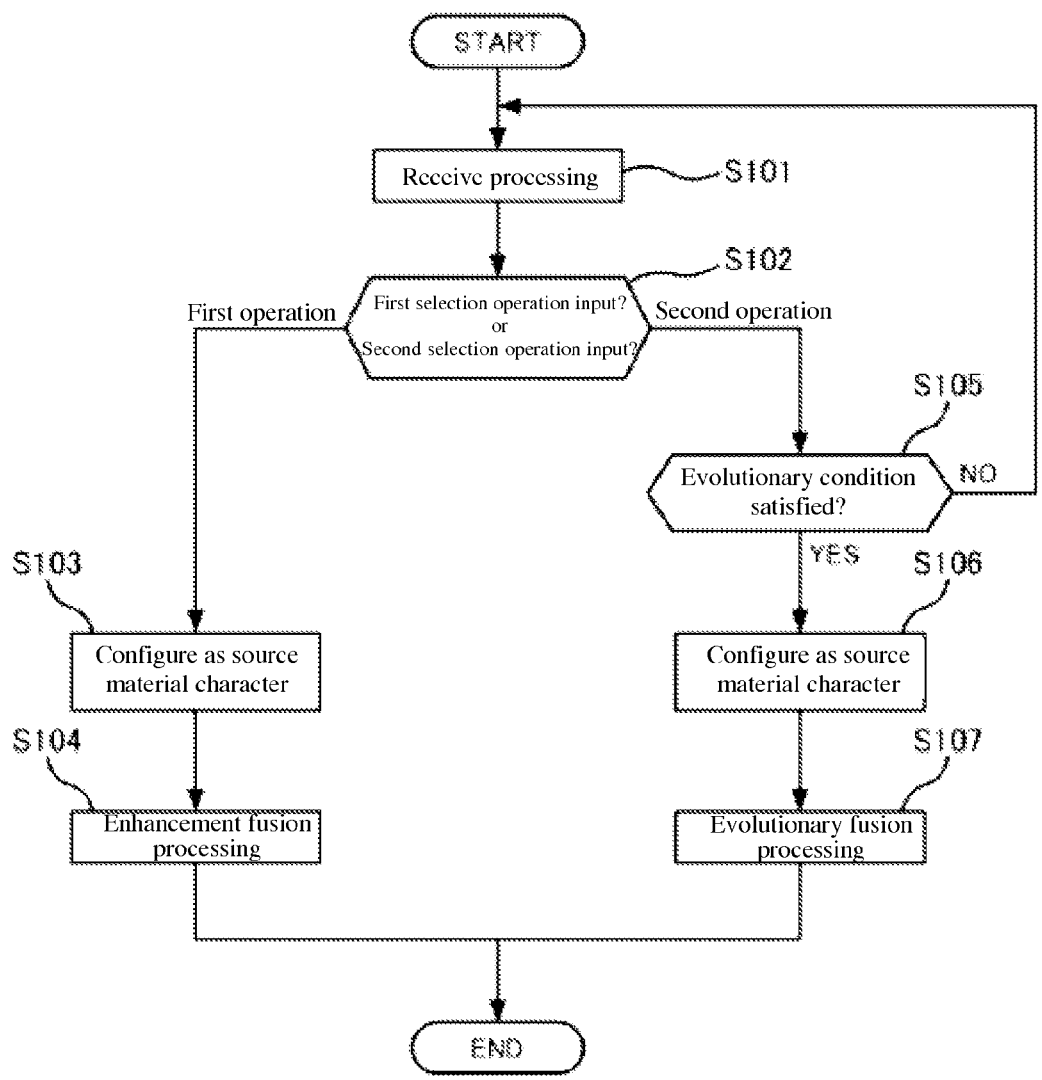
FIG. 14 A flow chart used to illustrate processing related to character selection.

FIG. 14 is a flow chart used to illustrate processing related to character selection.

First of all, when the game screen 50 shown in FIG. 9 is displayed on the terminal display unit 24 of the player terminal 20, the receive processing unit 211 receives the player's selection operation input when the player selects a character from among the multiple characters 54-58 (S101).

Next, the determination unit 212 determines whether the player's selection operation input is a first selection operation input based on a first selection operation (tapping) performed by the player or whether it is a second selection operation input based on a second selection operation (flicking) performed by the player (S102). Specifically, when the player's selection operation is performed, the touch panel detects the player's haptic operation input on the game screen 50. Then, based on the detection information obtained from the touch panel, the determination unit 212 determines whether the selection operation is tapping or flicking.

Next, if based on the determination results obtained in Step 102 it is determined that a first selection operation input has been received, the selected character configuration processing unit 213 configures the character selected by the player as a selectable object and, at the same time, configures the character used as a selectable object as a source material character used for enhancement fusion (S103). At such time, the selected character configuration processing unit 213 stores such configuration information in the terminal storage unit 22.

Next, once the source material character has been configured, the base character is subjected to enhancement fusion processing (S104). Namely, the game progress processing unit 215 refers to the proprietary character information shown in FIG. 7 and selects a base character pre-specified by the player from the multiple characters the player owns. Then, based on the Attack Power, Defense Power, and Physical Strength (current values of the capability parameters) of the source material character selected by the player, the game progress processing unit 215 increases the Attack Power, Defense Power, and Physical Strength (current values of the capability parameters) of the base character and reconfigures the new capability parameters obtained after the increase in the base character. In the present embodiment, the higher the values of the capability parameters of the source material character, the greater the increase in the values of the capability parameters of the base character. At such time, the game progress processing unit 215 updates the proprietary character information shown in FIG. 7 such that while the source material character used for the enhancement fusion is not placed in the possession of the player, the base character generated after the enhancement fusion becomes property of the player.

Further, if based on the determination results obtained in Step S102 it is determined that a second selection operation input has been received, then a determination is made as to whether an evolutionary condition has been satisfied (S105). Namely, by referring to the fusion information shown in FIG. 8, the determination unit 212 makes a determination as to whether the character selected by the player is a source material character that can be used for the evolutionary fusion of the base character. In the present embodiment, it is determined that the evolutionary condition has been satisfied if, for example, the character selected by the player is the same character as the base character (if it is a character associated with the same Character ID).

Then, if it is determined that the evolutionary condition has not been satisfied (S105: NO), the second selection operation input is not authorized and cancelled, and the routine goes back to Step 101. On the other hand, if it is determined that that the evolutionary condition has been satisfied (S105: YES), the selected character configuration processing unit 213 configures the character selected by the player as a selectable object and, at the same time, configures the character used as a selectable object as a source material character used for evolutionary fusion (S106). At such time, the selected character configuration processing unit 213 stores such configuration information in the terminal storage unit 22.

Next, once the source material character has been configured, the base character is subjected to evolutionary fusion processing (S107). Namely, the game progress processing unit 215 refers to the proprietary character information shown in FIG. 7 and selects a base character pre-specified by the player from the multiple characters the player owns. Then, based on the Attack Power, Defense Power, and Physical Strength (current values of the capability parameters) of the source material character selected by the player, the game progress processing unit 215 increases the Attack Power, Defense Power, and Physical Strength (current values of the capability parameters) of the base character and, at the same time, increases the Upper Attack Power Limit, Upper Defense Power Limit, and Upper Physical Power Limit (current upper limit values of the capability parameters) of the base character and reconfigures the new capability parameters obtained after the increase in the base character. At such time, the game progress processing unit 215 updates the proprietary character information shown in FIG. 7 such that while the source material character used for the evolutionary fusion is not placed in the possession of the player, the base character generated after the evolutionary fusion becomes property of the player.

As described above, in the game program of the present embodiment, the player's first selection operation input or second selection operation input is received when the player selects a character from among the multiple characters 54-58 when the character placement area 53 is displayed on the game screen 50. If the first selection operation input is received, then the character selected by the player is configured as a selectable object and, at the same time, this character is configured as a source material character used for enhancement fusion. Furthermore, if the second selection operation input is received, then the character selected by the player is configured as a selectable object and, at the same time, this character is configured as a source material character used for evolutionary fusion. In this manner, it becomes possible for the player to simultaneously select the source material character and the method of its fusion by performing a single selection operation, thereby improving the operational functionality of the selection operations performed by the player.

Embodiment 2

A game system 1 according to a second embodiment of the present invention will be discussed below. In the game system 1 according to the second embodiment, unlike the game system 1 according to the first embodiment discussed above, running a game program downloaded from the server device 10 makes it possible for the player terminal 20 to allow the player to simultaneously select a source material character used for enhancement fusion and a source material character used for evolutionary fusion on the same game screen.

<Screen Transitions Related to Selection Operations>

Figure 15:
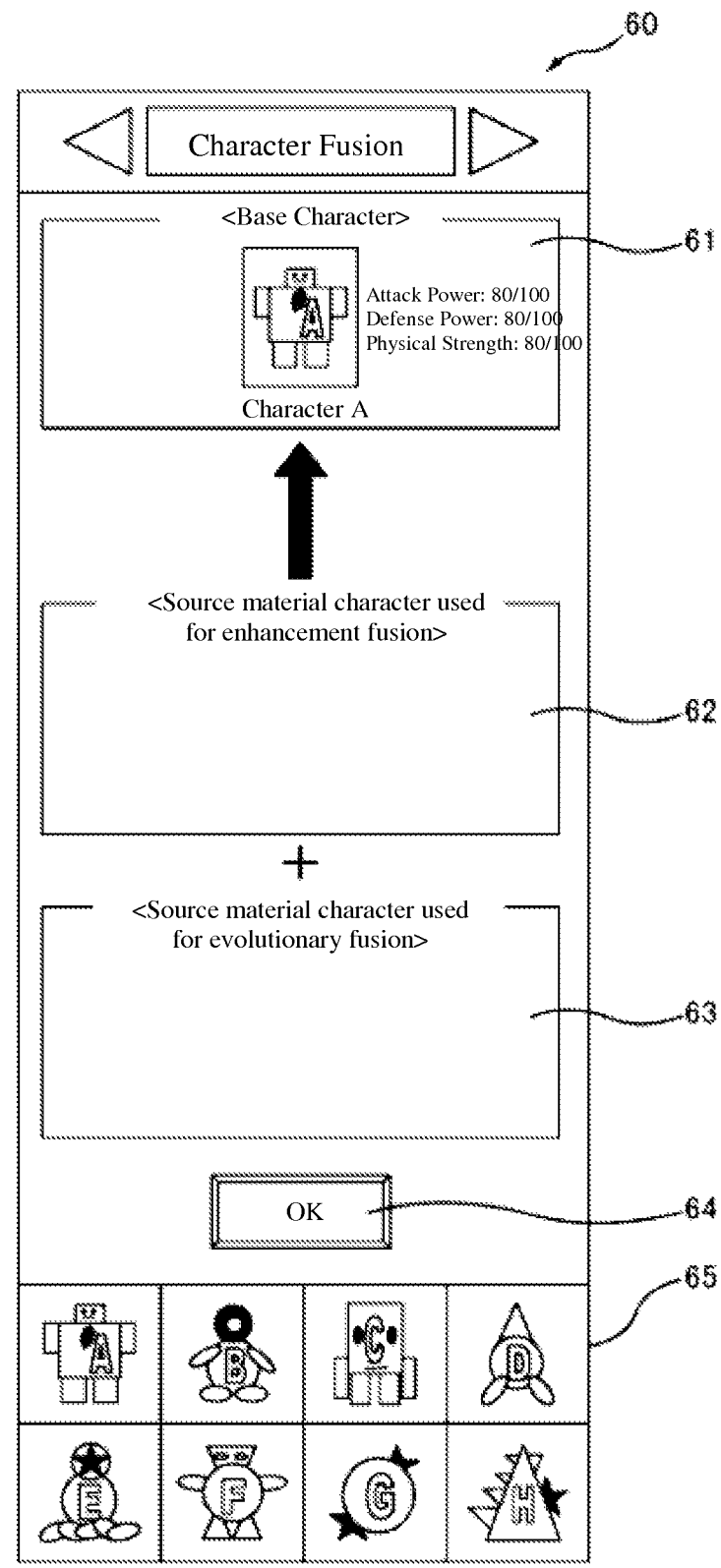
FIG. 15 A diagram showing an example of the game screen 60 displayed before character fusion.

FIG. 15 is a diagram showing an example of the game screen 60 displayed before character fusion. A base character placement area 61, a placement area for source material characters used for enhancement fusion 62 (first placement area for source material characters), a placement area for source material characters used for evolutionary fusion 63 (second placement area for source material characters), control button 64, and a placement area for character candidates eligible for selection 65 are displayed on the game screen 60. Here, "Character A" is configured as the base character and Attack Power, Defense Power, and Physical Strength of the base character are displayed in the base character placement area 61 as the capability parameters of this "Character A". For each parameter, the displayed upper limit value is "100" points and the current value is "80" points. Eight characters used as candidates eligible for selection are displayed in the placement area for character candidates eligible for selection 65. The eight characters are characters chosen from among the characters the player owns.

Figure 16:
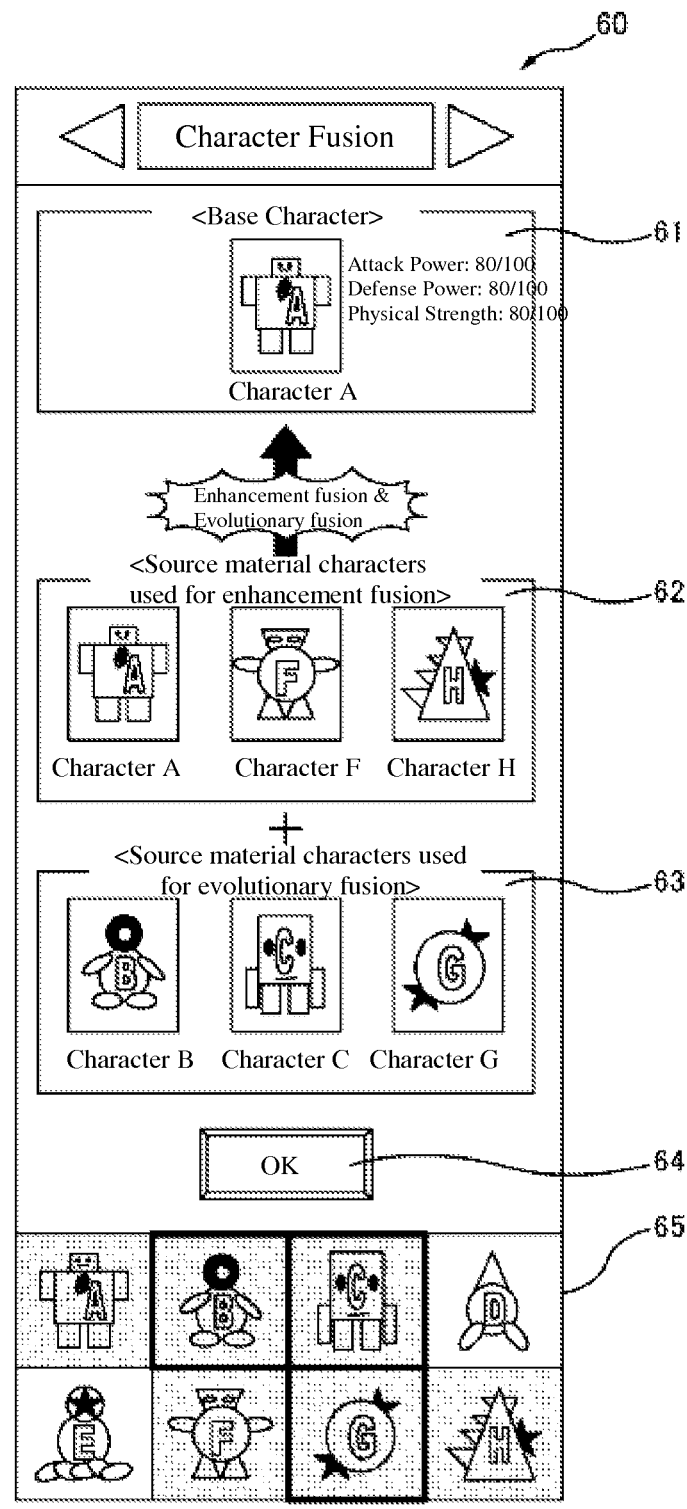
FIG. 16 A diagram used to illustrate a case in which the first selection operation and the second selection operation are performed by the player simultaneously.

FIG. 16 is a diagram used to illustrate a case in which the first selection operation and the second selection operation are performed by the player simultaneously. When the game screen 60 shown in FIG. 15 is displayed, the player, by operating the touch panel, can select a source material character used for enhancement fusion and a source material character used for evolutionary fusion from among the eight characters placed in the placement area for character candidates eligible for selection 65.

The source material character used for enhancement fusion is selected as a result of a first selection operation performed by the player. The first selection operation is performed by tapping on a character located in the placement area for character candidates eligible for selection 65. When the player lifts his or her finger off the game screen 60, the character is moved from the placement area for character candidates eligible for selection 65 to the placement area for source material characters used for enhancement fusion 62. In the placement area for character candidates eligible for selection 65, the location of the selected character is indicated in gray. Here, as shown in FIG. 16, "Character A", "Character F", and "Character H" are configured as source material characters used for enhancement fusion and placed in the placement area for source material characters used for enhancement fusion 62.

The source material character used for evolutionary fusion is selected as a result of a second selection operation performed by the player. The second selection operation is performed by touching and sliding a character located in the placement area for character candidates eligible for selection 65. When the player lifts his or her finger used to slide the character off the game screen 60, this character is moved from the placement area for character candidates eligible for selection 65 to the placement area for source material characters used for evolutionary fusion 63. In the placement area for character candidates eligible for selection 65, the location of the selected character is indicated in gray and is displayed in a thick black frame for emphasis. Here, as shown in FIG. 16, "Character B", "Character C", and "Character G" are configured as source material characters used for evolutionary fusion and placed in the placement area for source material characters used for evolutionary fusion 63.

Then, the enhancement fusion and evolutionary fusion of the base character placed in the base character placement area 61 are simultaneously started when the control button 64 is selected by the player while the source material character used for enhancement fusion and source material character used for evolutionary fusion are located, respectively, in the placement area for source material characters used for enhancement fusion 62 and placement area for source material characters used for evolutionary fusion 63.

In this manner, in the present embodiment, the enhancement fusion and evolutionary fusion of the base character are started simultaneously as a result of source material character selection and fusion method selection being performed simultaneously on the same game screen. For this reason, the player does not need to spend time on performing operations to initiate fusion (e.g., there is no need to switch between the game screen used for enhancement fusion and the game screen used for evolutionary fusion, no need to spend time on pressing a "Start Fusion" button used for enhancement fusion or a "Start Fusion" button used for evolutionary fusion, etc.), and this improves the operational functionality.

<<Operation of Player Terminal 20>>

Figure 17:
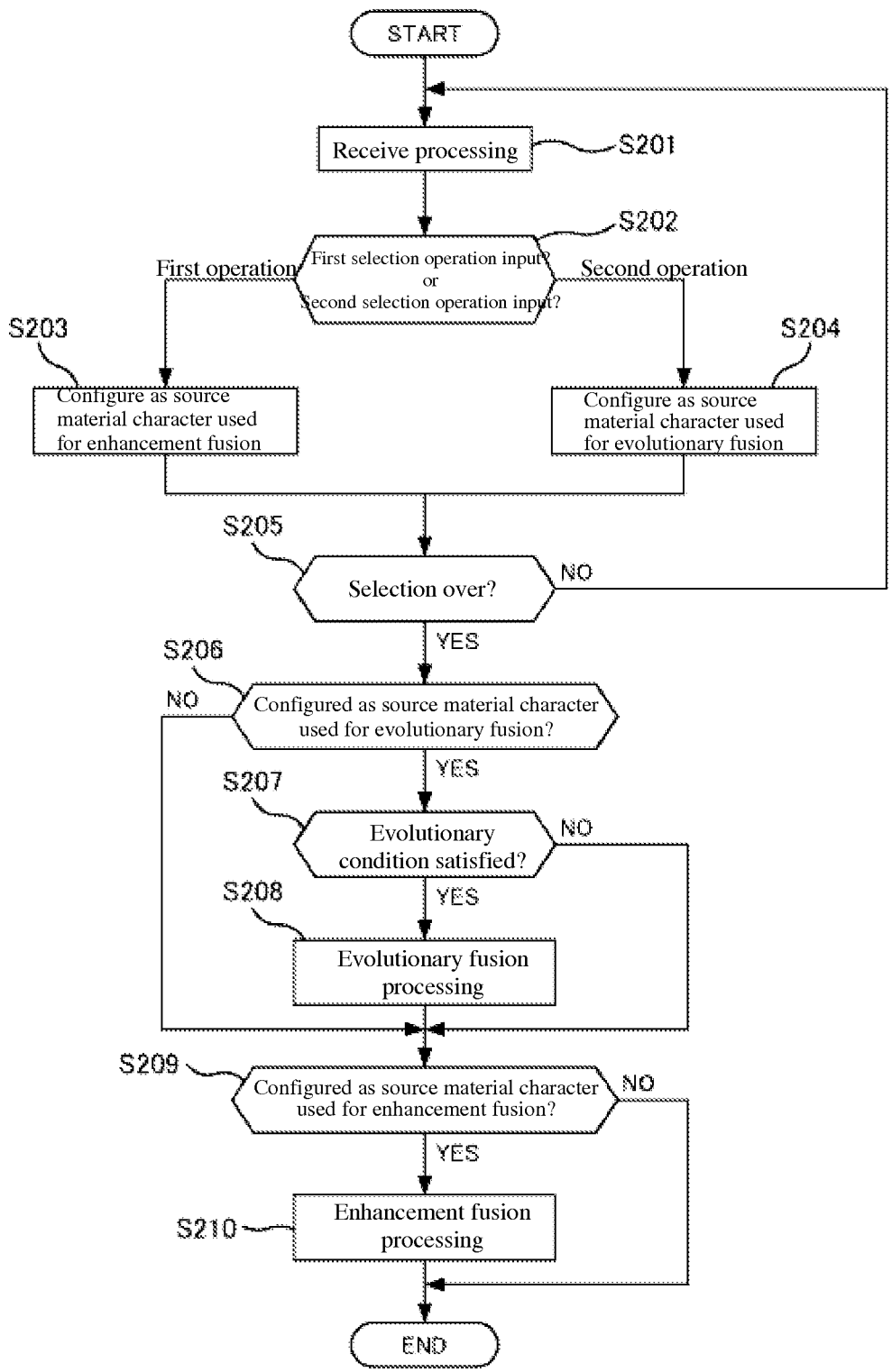
FIG. 17 A flow chart used to illustrate processing related to character selection.

FIG. 17 is a flow chart used to illustrate processing related to character selection.

First of all, when the game screen 60 shown in FIG. 15 is displayed on the terminal display unit 24 of the player terminal 20, the receive processing unit 211 receives the player's selection operation input when the player selects a character from among the multiple characters located in the placement area for character candidates eligible for selection 65 (S201).

Next, the determination unit 212 determines whether the player's selection operation input is a first selection operation input based on a first selection operation (tapping) performed by the player or whether it is a second selection operation input based on a second selection operation (flicking) performed by the player (S202). Specifically, when the player's selection operation is performed, the touch panel detects the player's haptic operation input on the game screen 60. Then, based on the detection information obtained from the touch panel, the determination unit 212 determines whether the selection operation is tapping or flicking.

Next, if based on the determination results obtained in Step 202 it is determined that a first selection operation input has been received, the selected character configuration processing unit 213 configures the character selected by the player as a selectable object and, at the same time, configures the character used as a selectable object as a source material character used for enhancement fusion (S203). At such time, the selected character configuration processing unit 213 stores such configuration information in the terminal storage unit 22.

On the other hand, if based on the determination results obtained in Step 202 it is determined that a second selection operation input has been received, the selected character configuration processing unit 213 configures the character selected by the player as a selectable object and, at the same time, configures the character used as a selectable object as a source material character used for evolutionary fusion (S204). At such time, the selected character configuration processing unit 213 stores such configuration information in the terminal storage unit 22.

Next, when the player selects the control button 64, the determination unit 212 makes a determination as to whether source material character selection is over (S205). Then, if it is determined that the selection is not over yet (S205: NO), the routine goes back to Step 201, and another selection operation input from the player is received.

On the other hand, if it is determined that the selection is over (S205: YES), the determination unit 212 uses the configuration information stored in the terminal storage unit 22 to make a determination as to whether a source material character used for evolutionary fusion has been configured (S206).

Next, if the determination made in Step 206 is negative, the routine advances to Step 209. The processing that follows after Step 209 will be described below. On the other hand, if the determination made in Step 206 is positive, a determination is made as to whether or not the evolutionary condition has been satisfied (S207). Namely, by referring to the fusion information shown in FIG. 8, the determination unit 212 makes a determination as to whether the character selected by the player is a source material character that can be used for the evolutionary fusion of the base character. In the present embodiment, the evolutionary condition is determined to have been satisfied if all the characters selected by the player match all the source material characters pre-associated with the base character (see FIG. 8).

Then, if it is determined that the evolutionary condition has been satisfied (S207: YES), the base character is subjected to evolutionary fusion processing (S208). Namely, the game progress processing unit 215 refers to the proprietary character information shown in FIG. 7 and selects a base character pre-specified by the player from the multiple characters the player owns. Then, based on the Attack Power, Defense Power, and Physical Strength (current values of the capability parameters) of the source material character selected by the player, the game progress processing unit 215 increases the Attack Power, Defense Power, and Physical Strength (current values of the capability parameters) of the base character and, at the same time, increases the Upper Attack Power Limit, Upper Defense Power Limit, and Upper Physical Power Limit (current upper limit values of the capability parameters) of the base character and reconfigures the new capability parameters obtained after the increase in the base character. At such time, the game progress processing unit 215 updates the proprietary character information shown in FIG. 7 such that while the source material character used for the evolutionary fusion is not placed in the possession of the player, the base character generated after the evolutionary fusion becomes property of the player.

On the other hand, if it is determined that the evolutionary condition has not been satisfied (S207: NO), the determination unit 212 uses the configuration information stored in the terminal storage unit 22 to make a determination as to whether a source material character used for enhancement fusion has been configured (S209). If the determination is positive (S209: YES), the base character is subjected to enhancement fusion processing (S210), and if the determination is negative (S209: NO), this process is terminated.

In Step 210 the base character is subjected to enhancement fusion processing. It should be noted that if the base character is subjected to evolutionary fusion processing in Step 208, the base character that has undergone evolutionary fusion is further subjected to enhancement fusion. Namely, the game progress processing unit 215 refers to the proprietary character information shown in FIG. 7 and selects a base character pre-specified by the player (a base character generated by evolutionary fusion if evolutionary fusion processing has been carried out) from the multiple characters the player owns. Then, based on the Attack Power, Defense Power, and Physical Strength (current values of the capability parameters) of the source material character selected by the player, the game progress processing unit 215 increases the Attack Power, Defense Power, and Physical Strength (current values of the capability parameters) of the base character and reconfigures the new capability parameters obtained after the increase in the base character. In the present embodiment, the higher the values of the capability parameters of the source material character, the greater the increase in the values of the capability parameters of the base character. At such time, the game progress processing unit 215 updates the proprietary character information shown in FIG. 7 such that while the source material character used for the enhancement fusion is not placed in the possession of the player, the base character generated after the enhancement fusion becomes property of the player.

As described above, in the game program of the present embodiment, the player's first selection operation input or second selection operation input is received as a result of the player's simultaneously selecting a character used for enhancement fusion and a character used for evolutionary fusion when the placement area for character candidates eligible for selection 65 is displayed on the game screen 60. If the first selection operation input is received, then the character selected by the player is configured as a selectable object and, at the same time, this character is configured as a source material character used for enhancement fusion. Furthermore, if the second selection operation input is received, then the character selected by the player is configured as a selectable object and, at the same time, this character is configured as a source material character used for evolutionary fusion. In this manner, it becomes possible for the player to simultaneously select the source material character and the method of its fusion by performing a single selection operation on a single game screen, thereby improving the operational functionality of the selection operations performed by the player.

Other Embodiments

The embodiments described above are intended to facilitate the understanding of the present invention and are not to be construed as limiting of the present invention. The present invention may be modified and improved without departing from the spirit thereof, and the present invention includes equivalents thereto. In particular, the embodiments described below are also included in the present invention.
<First Selection Operation Input & Second Selection Operation Input>

Although in the present embodiments as described above the explanations are given with reference to a case in which the first selection operation is performed by tapping on the location of the character displayed on the game screen 50, and to a case in which the second selection operation is performed by flicking the location of the character displayed on the game screen 50, the present invention is not limited thereto. For example, other operations may be used, such as applying pressure to the location of the character displayed on the game screen 50 for a predetermined period of time, or double-tapping on the game screen 50, etc.
<Enhancement Fusion>

Although in the present embodiments as described above the explanations are given with reference to a case in which a base character is subjected to enhancement fusion using a single character, the present invention is not limited thereto. For example, the base character may be subjected to enhancement fusion using multiple characters.

Figure 18:
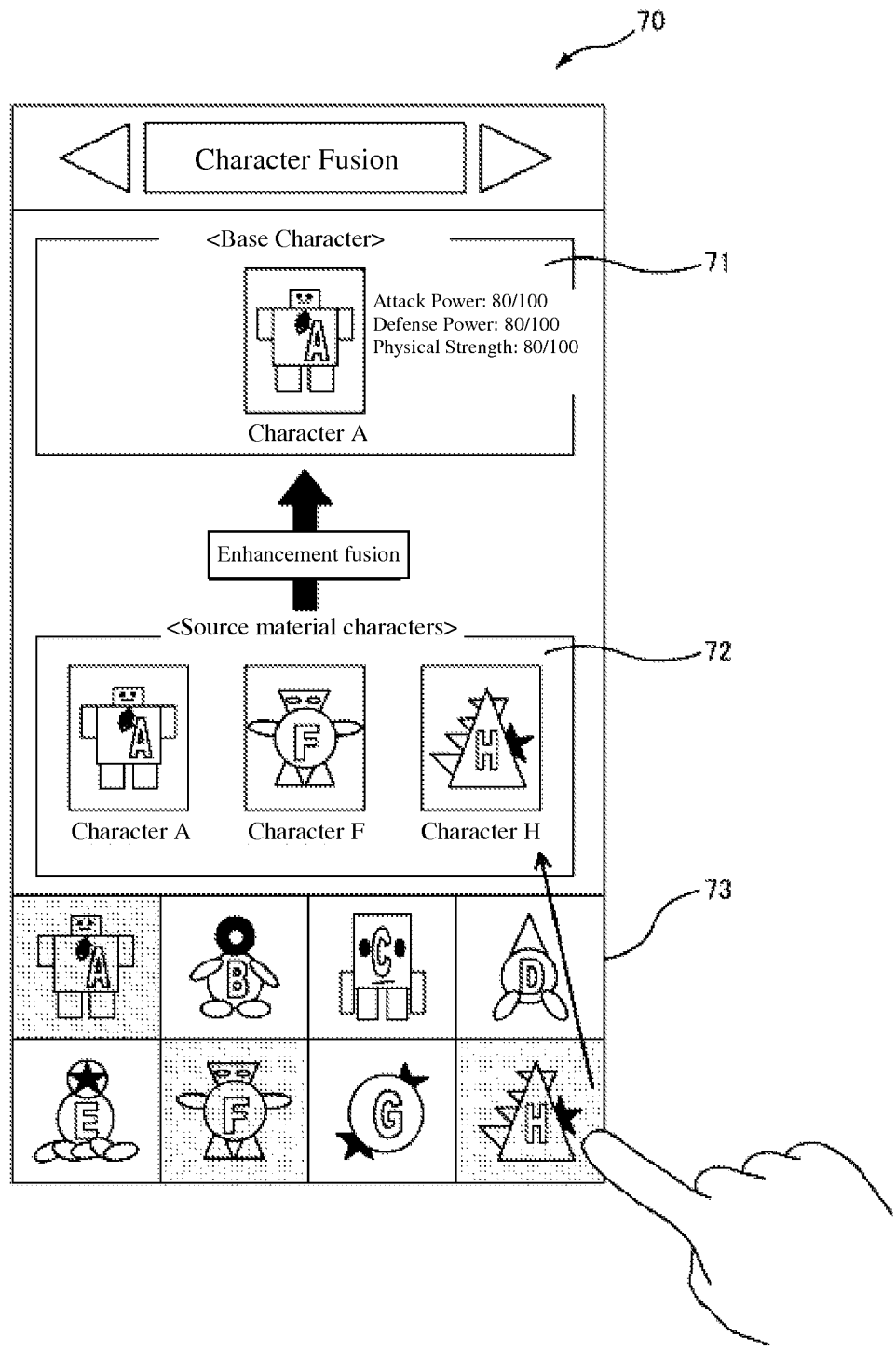
FIG. 18 A diagram used to illustrate another example of the first selection operation.

Specifically, this can be implemented by having the player perform the first selection operation in a continuous manner while the game screen 70 shown in FIG. 18 is displayed. A placement area for character candidates eligible for selection 73 and a game field area, which includes a base character placement area 71 and a source character placement area 72, are displayed on the game screen 70. Here, the explanations assume that a maximum of 3 source material characters can be continuously selected. For example, if the player performs a first selection operation three times in a row, the continuously selected "Character A", "Character F", and "Character H" are moved from the placement area for character candidates eligible for selection 73 to the source character placement area 72. Then, simultaneously with the player's final selection of "Character H", all the characters, i.e. "Character A", "Character F", and "Character H", are confirmed as source material characters and, at the same time, the enhancement fusion of "Character A", which is a base character, is automatically started. Namely, as soon as the number of the selected characters reaches the maximum number, the selected character configuration processing unit 213 confirms each character used as a selectable object and, at the same time, confirms each character as a source material character used for enhancement fusion. Then, when the multiple source material characters have been confirmed at once, the base character is subjected to enhancement fusion processing by the game progress processing unit 215.
<Evolutionary Fusion>

Figure 19:
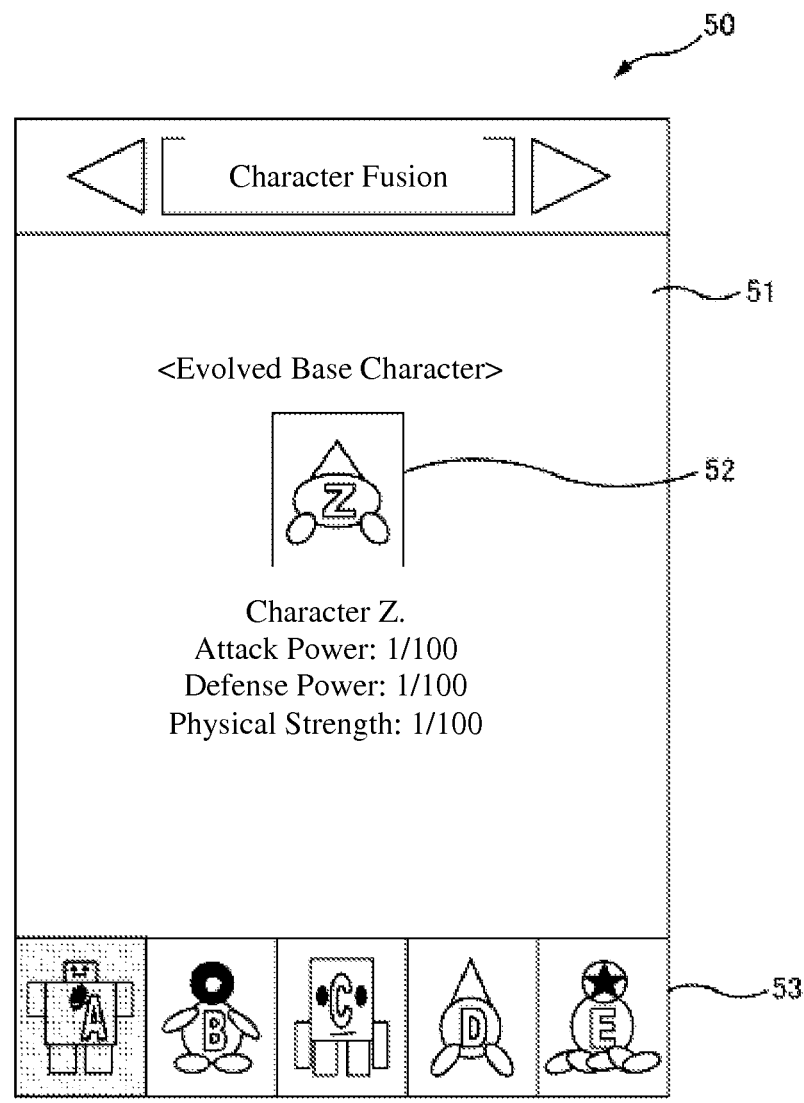
FIG. 19 A diagram showing another example of the game screen 50 displayed after evolutionary fusion.

Although in the present embodiments as described above the explanations are given with reference to a case in which the evolutionary fusion performed on the base character results in a reconfiguration such that the parameters values configured in the base character can be increased beyond the upper limit, the present invention is not limited thereto. For example, the base character may be changed to a base character of a different type by performing evolutionary fusion so as to change the Character ID associated with the base character before fusion to a different Character ID. Specifically, as a result of subjecting the base character 52 (which is "Character A" here) displayed on the game screen 50 shown in FIG. 9 to evolutionary fusion, the base character 52 generated after the evolutionary fusion may appear as a different "Character Z" displayed on the game screen 50 shown in FIG. 19.
<Evolutionary Conditions>

Although in the present embodiments as described above the explanations are given as an example of an evolutionary condition with reference to a case in which the source material character selected by the player is the same character as the base character (a character having the same Character ID associated therewith), the present invention is not limited thereto. For example, the evolutionary condition may consist in using the fusion information shown in FIG. 8 to subject the base character to evolutionary fusion by simultaneously using all the source material characters associated with the base character. Specifically, if the player performs the second selection operation 3 times in a row when 3 source material characters are associated with the base character in the fusion information shown in FIG. 8, as soon as the final character is selected among the characters continuously selected, all the 3 characters are confirmed as source material characters and, at the same time, the evolutionary fusion of the base character is automatically started.
<Server Device>

In the present embodiments as described above, the explanations are given with reference to a game system 1 equipped with a single server device 10 as an example of a service device. The invention, however, is not limited thereto and a game system 1 equipped with multiple server devices 10, as an example of server devices, may also be used. In other words, multiple server devices 10 may be connected over a network 2 and these server devices 10 may perform various types of processing in a distributed manner.

<Information Processing Device>

Although in the game system 1 used in the present embodiments as described above the explanations are given with reference to a case in which various types of information processing are carried out by the player terminals 20 based on the game program, but the invention is not limited thereto, and the above-mentioned various types of information processing may be carried out based on the game program by the server device 10 alone.

In addition, a configuration may be used, in which the server device 10 supports part of the information processing device functionality. In such a case, the server device 10 and player terminals 20 constitute an information processing device.

It should be noted that the information processing device is an example of a computer.

DESCRIPTION OF THE REFERENCE NUMERALS

1 Game system, 2 Network, 10 Server device, 11 Control unit, 12 Storage unit, 13 Input unit, 14 Display unit, 15 Communication unit, 20 Player terminal, 21 Terminal control unit, 22 Terminal storage unit, 23 Terminal input unit, 24 Terminal display unit, 25 Terminal communication unit, 50 Game screen, 51 Game field area, 52 Base character, 53 Character placement area, 54 Character, 55 Character, 56 Character, 57 Character, 58 Character, 60 Game screen, 61 Base character placement area, 62 Placement area for source material characters used for enhancement fusion, 63 Placement area for source material characters used for evolutionary fusion, 64 Control button, 65 Placement area for character candidates eligible for selection, 70 Game screen, 71 Base character placement area, 72 Source character placement area, 73 Placement area for character candidates eligible for selection, 211 Receive processing unit, 212 Determination processing unit, 213 Selected character configuration processing unit, 214 Character placement unit, 215 Game progress processing unit, 216 Screen generation processing unit

The invention claimed is:

1. A non-transitory computer-readable medium including instructions directing a computer to carry out a process, the instructions comprising:
   generating, on a touch panel, a single game screen comprising a character placement area, in which multiple characters that a player may select are placed;
   processing, on the touch panel a selection operation gesture from the player by allowing the player to select any character among the multiple characters when the character placement area is displayed on the single game screen;
   determining whether the received selection operation gesture is one of a first selection operation gesture and a second selection operation gesture;
   in response to the first selection operation gesture the character selected by the player is simultaneously configured as a selectable object and the character used as a selectable object is configured for first fusion processing as a source material character used to vary parameter values configured in a base character up to an upper limit, and,
   in response to the second selection operation gesture the character selected by the player is simultaneously configured as a selectable object and the character used as a selectable object is configured for second fusion processing as a source material character used to enable parameter values configured in the base character to be increased beyond the upper;
   upon confirmation of the character configured as the selectable object:
      for the character configured as a selectable object and configured for the first fusion processing, conducting the first fusion processing on the character configured as a selectable object and configured for the first fusion processing, the first fusion processing comprising causing the character configured as the selectable object to be removed from player possession, and varying parameter values configured in the base character up to an upper limit, and
      for the character configured as a selectable object and configured for the second fusion processing, conducting the second fusion processing on the character configured as a selectable object and configured for the second fusion processing, the second fusion processing comprising causing the character configured as the selectable object to be removed from player possession and enabling parameter values configured in the base character to be increased beyond the upper limit.

2. The non-transitory computer-readable medium according to claim 1, wherein the game screen comprises a game field area, in which the characters configured as selectable objects based on the first selection operation gesture by the player can be placed until a maximum number is reached, and wherein the instructions comprise, in response to the first operation gesture and a confirmation of the characters configured as selectable objects as soon as the number of the characters placed in the game field area reaches the maximum number, confirming each character as a source material character used to vary the parameter values configured in the base character up to an upper limit.

3. The non-transitory computer-readable medium according to claim 1, wherein the instructions further comprise, in response to the second selection operation gesture and a confirmation of the characters configured as selectable objects, the character used as a selectable object is confirmed as a source material character used to change the base character to a character of a different type or as a source material character used to enable parameter values configured in the base character to be increased beyond an upper limit.

4. The non-transitory computer-readable medium according to claim 1, wherein the game screen comprises the character placement area, a first source material character placement area, in which source material characters configured based on the player's first selection operation gesture are placed, and a second source material character placement area, in which source material characters configured based on the player's second selection operation gesture are placed, such that if the first selection operation gesture among the first selection operation gesture and the second selection operation gesture is received when the game screen is displayed, the character selected by the player in the character placement area is placed as a source material character in the first source material character placement area, and if the second selection operation gesture among the first selection operation gesture and the second selection operation gesture is received when the game screen is displayed, the character selected by the player in the character placement area is placed as a source material character in the second source material character placement area.

5. A non-transitory computer-readable medium including instructions directing a computer to carry out a process, the instructions comprising:
  generating, on a touch panel, a single game screen including a character placement area, in which multiple characters that a player may select are placed;
  processing, on the touch panel a selection operation gesture from the player by allowing the player to select any character among the multiple characters when the character placement area is displayed on the single game screen;
  determining whether the received selection operation gesture is one of a first selection operation gesture and a second selection operation gesture;
  in response to the first selection operation gesture, the character selected by the player is configured as a selectable object and, at the same time, the character used as a selectable object is configured for first fusion processing as a source material character used to vary parameter values configured in a base character up to an upper limit;
  in response to the second selection operation gesture, the character selected by the player is configured as a selectable object and, at the same time, the character used as a selectable object is configured for second fusion processing as a source material character used to change the base character to a character of a different type; and
  upon confirmation of the character configured as the selectable object:
    for the character configured as a selectable object and configured for the first fusion processing, conducting the first fusion processing on the character configured as a selectable object and configured for the first fusion processing, the first fusion processing comprising causing the character configured as the selectable object to be removed from player possession and varying parameter values configured in the base character up to an upper limit, and
    for the character configured as a selectable object and configured for the second fusion processing, conducting the second fusion processing on the character configured as a selectable object and configured for the second fusion processing, the second fusion processing comprising causing the character configured as the selectable object to be removed from player possession and changing the base character to a character of a different type.

6. An information processing device, comprising:
  a touch panel; and
  a processor, configured to:
  generate a single game screen on the touch panel including a character placement area where multiple characters that a player may select are placed;
  process a selection operation gesture on the touch panel from the player by allowing the player to select any character among the multiple characters when the character placement area is displayed on the single game screen;
  determine whether the received selection operation gesture is one of a first selection operation input and a second selection operation gesture;
  in response to the first selection operation gesture, simultaneously configure the character selected by the player as a selectable object and configure the character used as a selectable object for first fusion processing as a source material character used to vary parameter values configured in a base character up to an upper limit,
  in response to the second selection operation gesture, simultaneously configure the character selected by the player as a selectable object and configure the character used as a selectable object for second fusion processing as a source material character used to enable parameter values configured in the base character to be increased beyond the upper limit; and
  upon confirmation of the character configured as the selectable object:
    for the character configured as a selectable object and configured for the first fusion processing, conduct the first fusion processing on the character configured as a selectable object and configured for the first fusion processing, the first fusion processing comprising causing the character configured as the selectable object to be removed from player possession and varying parameter values configured in the base character up to an upper limit, and
    for the character configured as a selectable object and configured for the second fusion processing, conduct the second fusion processing on the character configured as a selectable object and configured for the second fusion processing, the second fusion processing comprising causing the character configured as the selectable object to be removed from player possession and enabling parameter values configured in the base character to be increased beyond the upper limit.

7. An information processing device, comprising:
  a touch panel; and
  a processor, configured to:
  generate a single game screen on the touch panel including a character placement area where multiple characters that a player may select are placed;
  process a selection operation gesture on the touch panel from the player by allowing the player to select any character among the multiple characters when the character placement area is displayed on the single game screen;
  determine whether the received selection operation input is one of a first selection operation gesture and a second selection operation gesture;
  in response to the first selection operation gesture, configure the character selected by the player as a selectable object and configure the character used as a selectable object for first fusion processing as a source material character used to vary parameter values configured in a base character up to an upper limit, and
  in response to the second selection operation gesture, simultaneously configure the character selected by the player as a selectable object and configure the character used as a selectable object for second fusion processing as a source material character used to change the base character to a character of a different type;
  upon confirmation of the character configured as the selectable object:
    for the character configured as a selectable object and configured for the first fusion processing, conduct the first fusion processing on the character configured as a selectable object and configured for the first fusion processing, the first fusion processing comprising causing the character configured as the selectable object to be removed from player possession and varying parameter values configured in the base character up to an upper limit, and for the character configured as a selectable object and configured for the second fusion processing, conduct the second fusion processing on the character configured as a selectable object and configured for the second fusion processing, the second fusion processing comprising causing the character configured as the selectable object to be removed from player possession and changing the base character to a character of a different type.

* * * * *